United States Patent [19]

Rau et al.

[11] 3,969,950
[45] July 20, 1976

[54] DRIVE ASSEMBLY

[75] Inventors: Jim Lee Rau, Lafayette; Hollis Newcomb White, Jr., West Lafayette, both of Ind.

[73] Assignee: TRW Inc., Cleveland, Ohio

[22] Filed: Mar. 4, 1974

[21] Appl. No.: 448,057

[52] U.S. Cl. .................................. 74/391; 74/801;
192/91 A; 180/66 F; 180/65 F
[51] Int. Cl.[2] ..................... F16H 35/00; F16H 1/28;
F16D 13/44; B60K 3/00
[58] Field of Search ............. 74/801, 391; 180/66 F,
180/65 F, 44 F; 188/18 A; 192/91 A

[56] References Cited
UNITED STATES PATENTS

| | | | |
|---|---|---|---|
| 2,665,674 | 1/1954 | Metsger et al. | 192/91 A X |
| 2,742,991 | 4/1956 | Gilbert et al. | 192/91 A |
| 2,763,160 | 9/1956 | Buckendale | 74/391 |
| 2,799,182 | 7/1957 | Butler | 74/391 X |
| 3,272,295 | 9/1966 | Clements | 192/91 A X |
| 3,320,828 | 5/1967 | Grant | 74/804 X |
| 3,686,978 | 8/1972 | Knoblach et al. | 74/801 |
| 3,749,195 | 7/1973 | Vegners | 180/66 F |
| 3,780,834 | 12/1973 | Lottridge et al. | 188/18 A |

FOREIGN PATENTS OR APPLICATIONS

| | | | |
|---|---|---|---|
| 363,922 | 12/1931 | United Kingdom | 180/65 F |

Primary Examiner—Samuel Scott
Assistant Examiner—P. S. Lall

[57] ABSTRACT

An improved drive assembly includes a gerotor-type hydraulic motor having a housing connected to a frame. An output member is rotatably mounted on a hollow spindle which is integrally formed with the motor housing. Operation of the motor rotates an input shaft which is disposed within the spindle and is connected with the output member through a gear arrangement. In order to tend to minimize the axial extent of the drive assembly, the gear arrangement is located inwardly of an outer end of the spindle. The gear arrangement includes a central or sun gear which is disposed within the spindle. A plurality of idler gears extend through openings formed in the spindle into engagement with the central gear. These idler gears meshingly engage a ring gear which is fixedly connected with the output member. The gerotor-type hydraulic motor includes a wobble shaft which is connected with the input shaft to the central gear by a coupling member. A stop member is movable in the spindle to disengage the input shaft from the central gear to deactivate the drive assembly.

17 Claims, 7 Drawing Figures

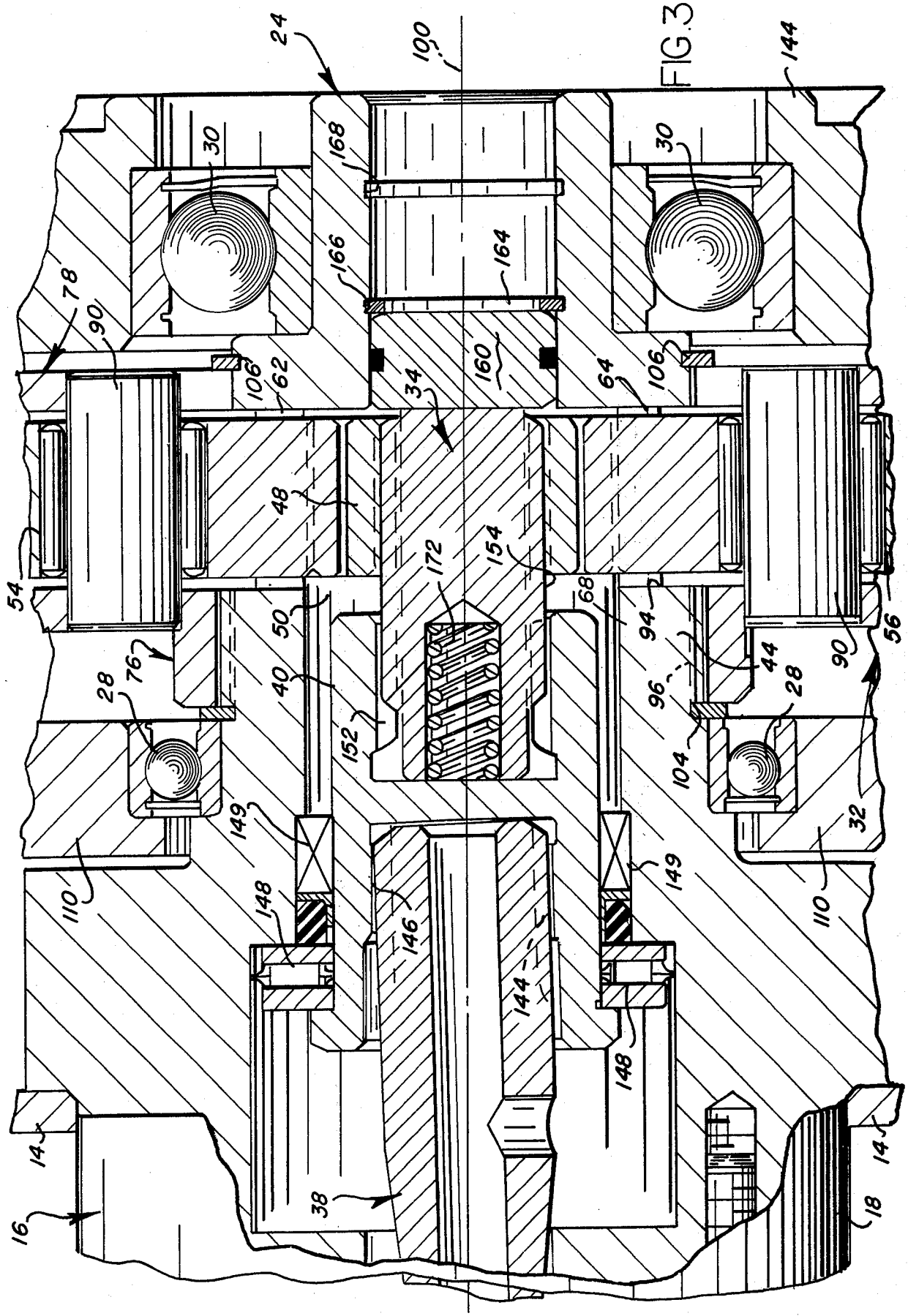

3,969,950

DRIVE ASSEMBLY

BACKGROUND OF THE INVENTION

The present invention relates to a drive assembly for rotating an output member.

There are many known hydraulic drive assemblies which are utilized for many different purposes including driving winches, mixers, and vehicle wheels. One of these known hydraulic drive assemblies is disclosed in U.S. Pat. No. 3,686,978. This known hydraulic drive assembly includes a hydraulic motor which is bolted to an axle spindle. The wheel of a vehicle is rotatably mounted on the axle spindle by a pair of bearing assemblies. A planetary-type gear reduction unit is mounted outwardly of the axle spindle and is effective to reduce the rate at which the wheel is driven upon operation of the drive motor.

To enable a vehicle to be utilized under certain operating conditions, it is desirable to minimize the axial extent of the wheel drive assembly. Of course, when a gear reduction unit is mounted outwardly of the axle spindle, the wheel drive assembly tends to have a relatively large axial extent. The axial extent of the known wheel drive assembly also tends to be increased by the provision of a motor housing which is separate from the axle spindle.

SUMMARY OF THE PRESENT INVENTION

The present invention is drawn to a relatively compact and easily mounted drive assembly which can be utilized for many different purposes including driving a mixer or driving winch. In the specific preferred embodiment described herein, the drive assembly is utilized to rotate the wheel of a vehicle. This drive assembly includes a hydraulic motor having a housing which is integrally formed with an axle spindle. A hub which is adapted to be connected with the wheel of a vehicle, is rotatably mounted on the axle spindle. To tend to minimize the axial extent of the drive assembly, a gear arrangement for transmitting drive forces from the motor to the hub and wheel is disposed inwardly of an outer end of the axle spindle. To facilitate towing, the motor can be disconnected from the gear arrangement. It should be understood that the improved drive assembly can be used to transmit drive forces in environments other than vehicle drives.

Accordingly, it is an object of this invention to provide a drive assembly for rotating an output member and wherein the drive assembly has a relatively compact construction and short axial extent.

Another object of this invention is to provide a new and improved drive assembly for rotating an output member, such as the wheel of a vehicle, and wherein the drive assembly includes a motor having a housing which is integrally formed with a spindle which rotatably supports the output member.

Another object of this invention is to provide a drive assembly which includes a gear arrangement which is disposed inwardly of an outer end of a spindle and is operable to rotate an output member upon operation of a drive motor.

BRIEF DESCRIPTION OF THE DRAWINGS

The foregoing and other objects and features of the present invention will become more apparent upon a consideration of the following description taken in connection with the accompanying drawings wherein:

FIG. 3 is an enlarged sectional view of a portion of the drive assembly of FIG. 1;

DESCRIPTION OF ONE SPECIFIC PREFERRED EMBODIMENT OF THE INVENTION

Figure 1:
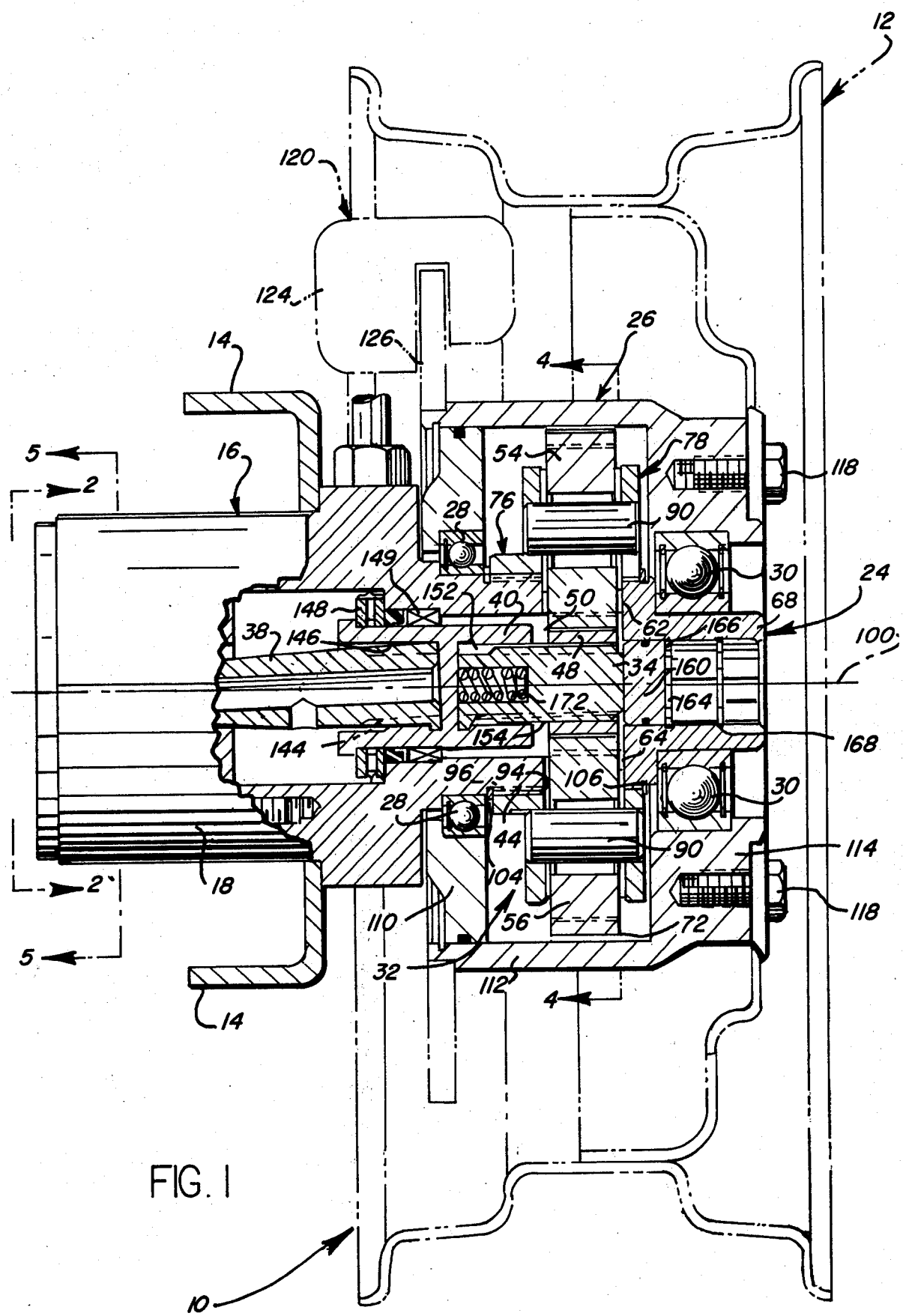
FIG. 1 is a sectional view of a drive assembly constructed in accordance with the present invention.

A compact drive assembly 10 (FIG. 1) is advantageously utilized to rotate a wheel or output member 12 relative to a base or frame 14 of a vehicle. However, the drive assembly 10 could be used in other environments if desired. The drive assembly 10 includes a gerotor-type hydraulic motor 16 having a housing 18 which is fixedly connected with the base frame 14 by suitable fasteners 20 (FIG. 2). The motor housing 18 (FIG. 1) is integrally formed with an axle spindle 24 on which a hub 26 is rotatably supported by suitable bearings 28 and 30. A gear arrangement 32 transmits drive forces from an input shaft 34 to the hub 26. The input shaft 34 is connected with a wobble shaft or drive link 38 of the motor 16 by an internally splined coupling 40.

In order to reduce the axial extent of the drive assembly 10, the gear arrangement 32 is mounted on a midsection 44 of the spindle 24 between the bearing assemblies 28 and 30. The gear arrangement 34 includes a central or sun gear 48 (see FIGS. 3 and 4) which is disposed within an axial extending chamber 50 formed within the axle spindle 24. The chamber 50 has a circular cross sectional configuration and completely encloses the sun gear 48. Idler gears 54, 56, and 58 (FIG. 4) extend through openings 62, 64, and 66 formed in a cylindrical wall 68 of the axle spindle 24. The idler gears 54, 56, and 58 are disposed in meshing engagement with both the sun gear 48 and an annular ring gear 72 which is fixedly connected with the hub 26.

Figure 2:
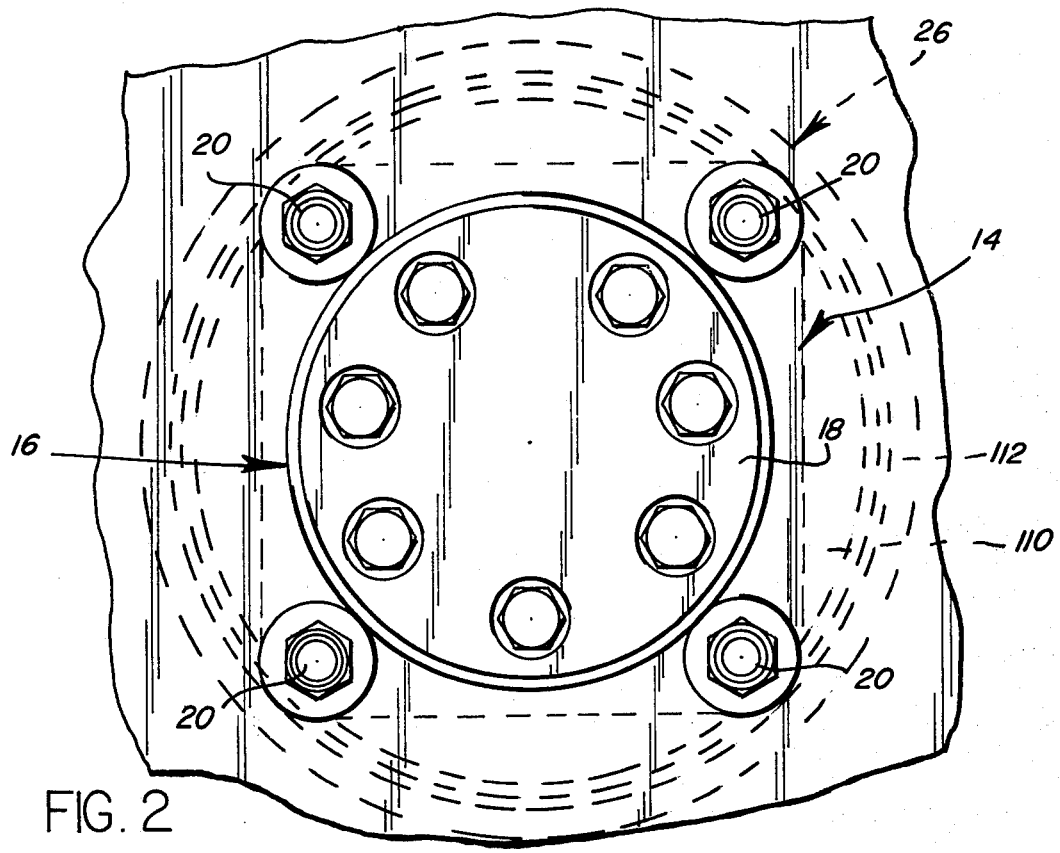
FIG. 2 is a view taken along the line 2—2 of FIG. 1 and illustrating the manner in which the drive assembly is connected with the frame of a vehicle.
Figure 4:
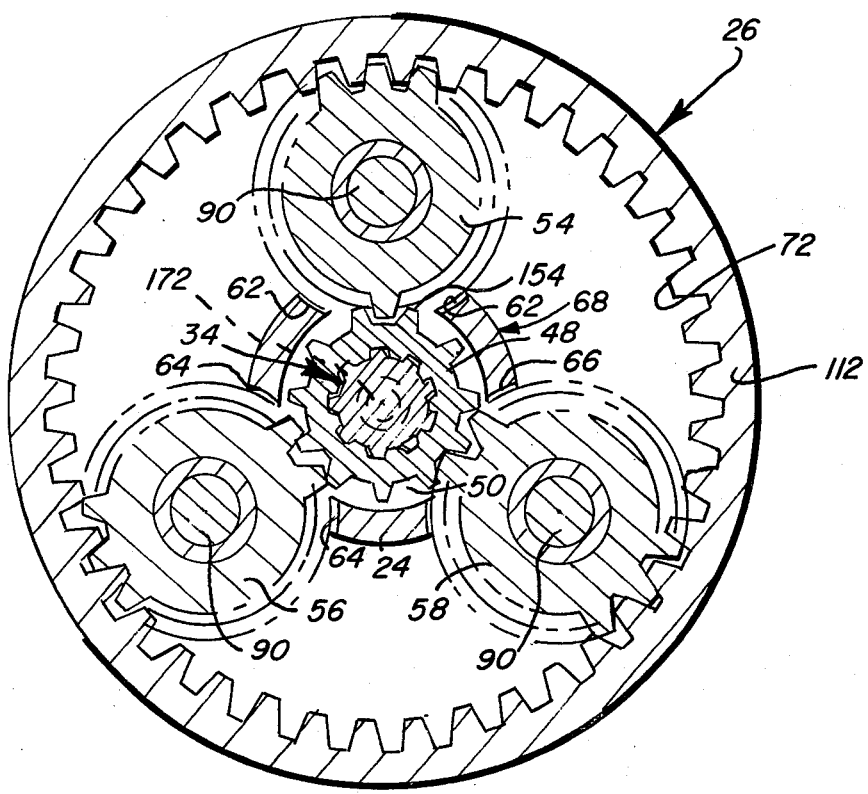
FIG. 4 is a sectional view, taken generally along the line 4—4 of FIG. 1, illustrating the relationship between an axle spindle, gear arrangement, and wheel hub.

The idler gears 54, 56, and 58 are supported on the midsection 44 of the spindle 24 by a pair of annular collars 76 and 78 (see FIG. 1) and support pins 90 (see FIGS. 1 and 4). The collar 76 is connected with the axle spindle 24 by engagement of internal splines 94 with external splines 96 formed on the axle spindle 24. The splines 94 and 96 hold the collar 76 against rotation about the central axis 100 of the axle spindle. The collar 76 is held against axially inward movement by a spacer member 104. The two collars 76 and 78 are held against axially outward movement by a snap ring 106 which engages an annular groove in the axle spindle 24.

Upon rotation of the input member 34 and sun gear 48 about the central axis 100 of the axle spindle 24, the idler gears 54, 56, and 58 are rotated about the support pins 90 to drive the ring gear 72. Since the ring gear 72 is fixedly connected with the hub 26 and wheel 12, the wheel and hub are rotated upon rotation of the sun gear 48. It should be noted that the hub 26 is supported for rotation about the axis 100 by the inside and outside gearing assemblies 28 and 30 (FIG. 1). Thus, an annular inner end wall 110 is fixedly connected with a generally cylindrical wall 112 of the hub 26 and engages the inner bearing assembly 28. An annular outer wall 114, which is integrally formed with the wall 112, engages the bearing assembly 30. The wheel 12 is fixedly connected with the outer wall 114 of the hub 26 by suitable connections 118.

In order to stop rotation of the wheel 12, a disc brake assembly 120 (FIG. 1) is associated with the wheel hub 26. The disc brake assembly 120 includes a caliper assembly 124 (shown schematically in FIG. 1) which is operable to grip an annular disc 126 in a known manner. The disc 126 is fixedly connected with the hub 26. The caliper assembly 124 is fixedly connected with the frame 14 of the vehicle so that upon operation of the caliper assembly, the disc 126 and hub 26 are held against rotation relative to the frame of the vehicle to thereby stop the wheel 12.

Figure 5:
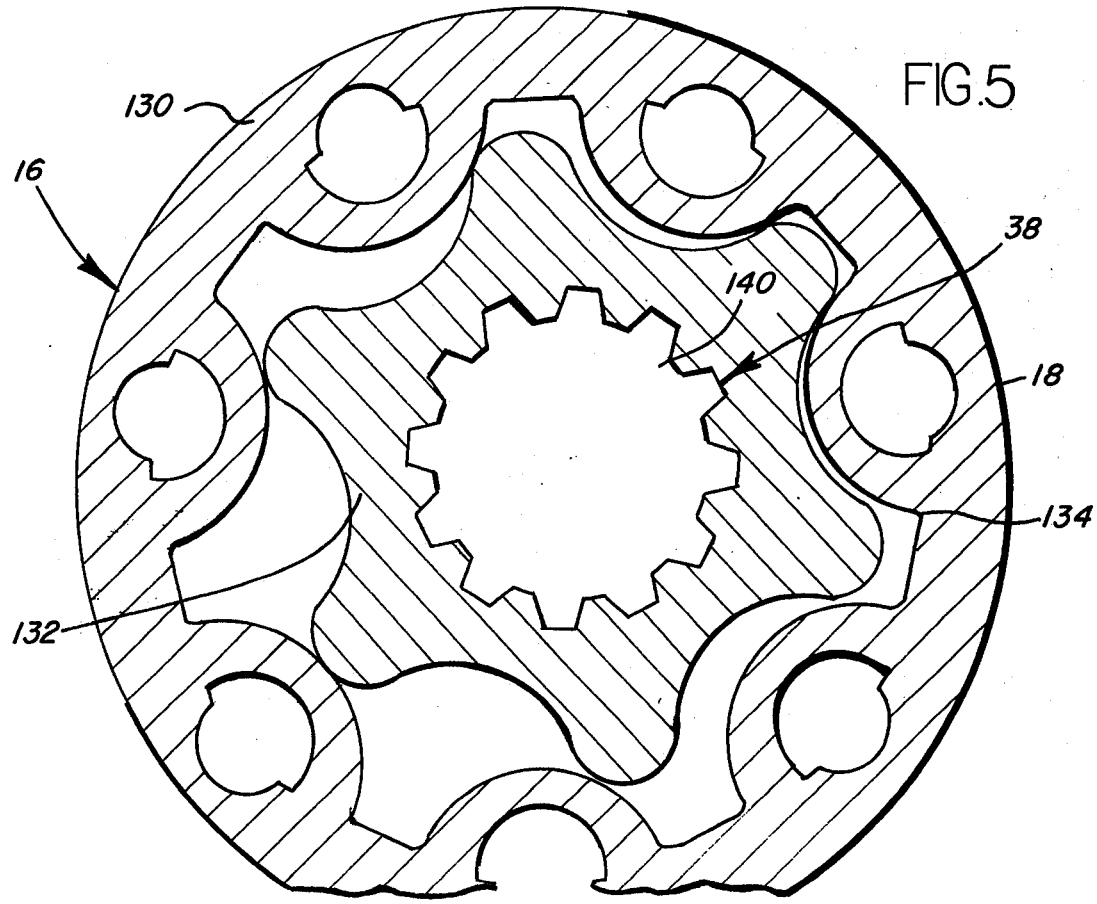
FIG. 5 is an enlarged sectional view, taken generally along the line 5—5 of FIG. 1, illustrating the relationship between a rotor and stator of a hydraulic drive motor.

The hydraulic drive motor 16 is of the gerotor type and includes an internally toothed stator 130 (FIG. 5) which is fixedly connected with the motor housing 16. An externally toothed rotor 132 is rotated and orbited relative to the stator 130 under the influence of high pressure fluid ported into some of the pockets formed between the rotor 132 and the stator 130. Other pockets formed between the rotor 132 and stator 130 are exhausted to drain so that the high pressure fluid is effective to rotate and orbit the rotor. A valve assembly cooperates with a rotor 132 to sequentially connect the pockets formed between the rotor and stator 130 with a source of high fluid pressure and with drain in the manner disclosed in U.S. Pat. No. 3,606,601. Although a specific stator and rotor construction has been illustrated in FIG. 5, it is contemplated that other known stator and rotor constructions could be utilized if desired. For example, a hydraulic motor having a vane stator could be used.

An inner end portion 140 of the wobble shaft 38 is connected with the rotor 132. Therefore, as the rotor 132 rotates and orbits relative to the stator 130, the inner end of the wobble shaft 140 is also rotated and orbited. Since the rotor 132 has six teeth, which is one less than the number of teeth on the stator 130, the inner end of the wobble shaft 38 is rotated through one complete revolution each time it completes six orbits. A splined outer end portion 144 of the wobble shaft 38 (see FIGS. 1 and 2) is disposed in meshing engagement with internal splines 146 of the coupling 40. The coupling 40 is mounted for rotation about the central axis 100 of the axle spindle 24 by a thrust bearing assembly 148 and a radial bearing 149. In view of the fact that the coupling member 40 is rotated through one revolution about the central axis 100 each time the wobble shaft 38 is rotated through a revolution, there is a six-to-one reduction between the speed of rotation of the rotor 132 and the speed of rotation of the coupling member 40. Since the mode of operation of the hydraulic motor 16 and the manner in which the wobble shaft 38 cooperates with the rotor 132, stator 130, and coupling member 40 is, per se, well known, it will not be further described herein to avoid prolixity of description.

Rotational movement of the coupling 40 is transferred to the input shaft 34 by internal splines 152 formed on the coupling member. These internal splines 152 are disposed in meshing engagement with external splines 154 on the input member 34 (see FIG. 3). Therefore, the input member 34 is rotated through one complete revolution each time the coupling member 40 is rotated through one complete revolution.

The gear arrangement 32 effects a four-to-one gear reduction. Thus, each time the input shaft 34 is rotated through four revolutions, the hub member 26 is rotated through one complete revolution. A twenty-four-to-one gear reduction is provided between the rotor 132 (see FIG. 5) and the hub 26. This relatively large gear reduction results from the fact that there is a six-to-one gear reduction between the rotor 132 and the input shaft 34 and a four-to-one gear reduction between the input shaft 34 and the hub 26. Of course, the rotor 132, stator 130, and gear arrangement 32 could be sized to obtain a different gear reduction. The specific values for the gear reduction are set forth herein only for purposes of clarity of description.

Figure 6:
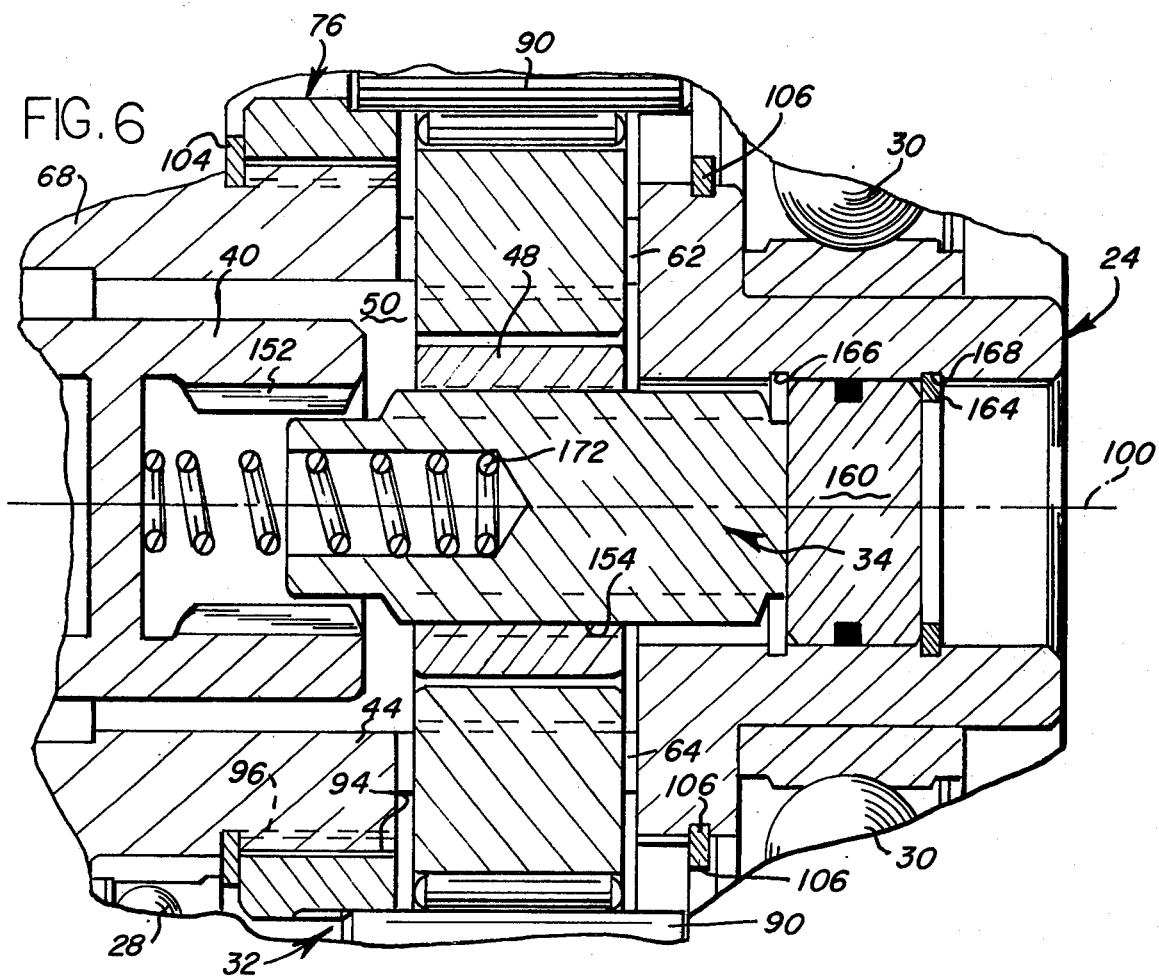
FIG. 6 is an enlarged fragmentary sectional view of a portion of the drive assembly of FIG. 1, illustrating an input shaft to the gearing arrangement in a disengaged condition.

It is contemplated that under certain conditions it will be desirable to disconnect the motor 16 from the wheel 12 so that the wheel can rotate freely, for example when the vehicle is to be towed. To disconnect the motor 16 from the wheel 12, the input shaft 34 is moved axially outwardly from the engaged position shown in FIG. 3 to the disengaged position shown in FIG. 6. This outward movement of the input shaft 34 disengages the splines 152 on the coupling member 40 from the splines 154 on the input member 34.

To release the input shaft 34 for axially outward movement, a circular stop member 160 is moved axially outwardly relative to the spindle 24. This is accomplished by releasing a snap ring 164 from an annular groove 166 formed in the spindle 24 (FIG. 3). The snap ring 164 is positioned to engage a second groove 168 to hold the stop member 160 in a position shown in FIG. 6. When the stop member 160 is in this position, a biasing spring 172 moves the input shaft outwardly against the stop member 160. As this occurs, the internal splines on the coupling member 40 are disengaged from the external splines on the input member 154. Therefore, rotation of the coupling member 40 by the wobble shaft 38 is ineffective to rotate the input member 34. In addition, if the vehicle is towed, rotation of the wheel 12 and hub 26 is ineffective to drive the coupling member 40 and wobble shaft 38 so that the wheel 12 can freely rotate relative to the axle spindle 24.

In the embodiment of the invention illustrated in FIGS. 1 through 6, the motor 16 is disconnected from the wheel 12 by moving the stop member 160 axially outwardly. It is contemplated that when the drive assembly 10 is utilized in certain environments, for example in association with winches, four-wheel drives, or a single-wheel drive, it may be advantageous to enable the motor 16 to be quickly disconnected from the gear arrangement 32 without disengaging the snap ring 164 to release the stop member 160. Accordingly, in the embodiment of the invention illustrated in FIG. 7, an input member is shifted axially under the influence of a fluid pressure force to operate the drive assembly from a disengaged condition to an engaged condition in which the input member is effective to transmit drive forces from a hydraulic motor to a gear arrangement. Since the embodiment of the invention illustrated in FIG. 7 is generally similar to the embodiment of the invention illustrated in FIGS. 1–6, similar numerals will be utilized to designate similar elements, the suffix letter *a* being added to the numerals associated with FIG. 7 to avoid confusion.

Figure 7:
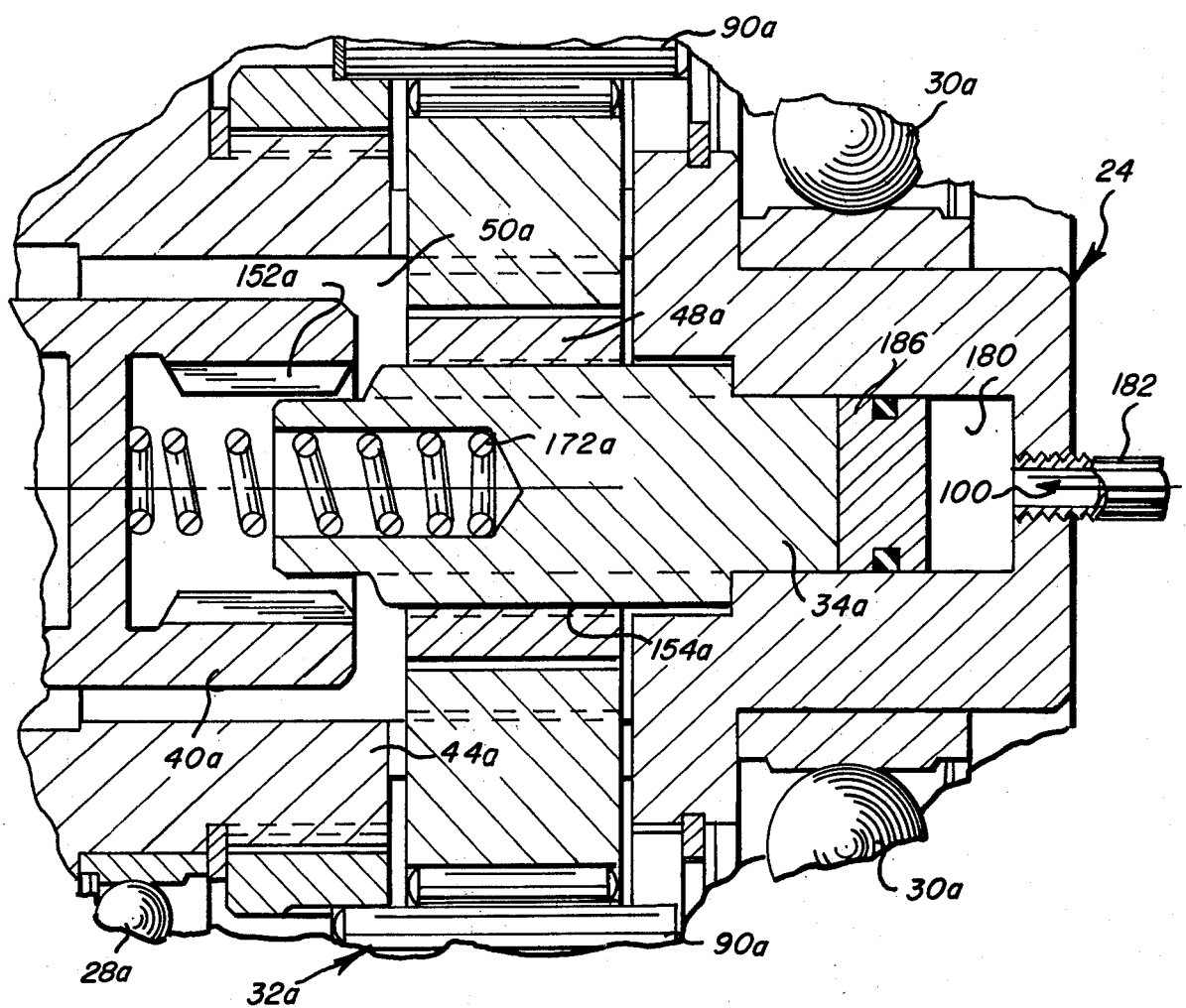
FIG. 7 is an enlarged fragmentary view of a second embodiment of the invention in which fluid pressure forces are utilized to move an input shaft to an engaged condition.

In the embodiment of the invention illustrated in FIG. 7, a pressure chamber 180 is formed in the axially outer end portion of the axle spindle 24. The pressure chamber 180 is connected by a conduit 182 to a suitable control valve (not shown). When the wheel hub (not shown) is to be driven, fluid under pressure is conducted from the control valve through the conduit 182 to the chamber 180. This fluid pressure is applied against a piston 186 to move an input shaft 34*a* axially toward the left (as viewed in FIG. 7). This leftward movement of the input shaft 34*a* moves axially extending external splines 154*a* on the input shaft 34*a* into meshing engagement with internal teeth or splines 152*a* formed on a coupling member 40*a*. The coupling member 40*a* is then drivingly connected with a gear arrangement 32*a* in much the same manner as illustrated in FIG. 3 for the embodiment of the invention shown in FIGS. 1–6.

When the drive between the hydraulic motor and the coupling 40*a* is to be disconnected, the chamber 180 is exhausted to drain through the conduit 182. This enables the input shaft 34*a* to be moved axially outwardly to the disengaged position shown in FIG. 7 under the influence of a biasing spring 172*a*. When the input shaft 34*a* is in the disengaged position of FIG. 7, operation of the associated hydraulic drive motor is ineffective to drive the gear arrangement 32*a*.

In view of the foregoing description, it can be seen that the drive assembly 10 is relatively compact and is capable of being utilized in many different environments to effect a relatively large gear reduction. The compact size of the drive assembly 10 results from the combined effects of integrally forming the housing 18 and spindle 24, mounting the gear arrangement 32 between the inner and outer end portions of the spindle, and engaging the coupling member 40 with the outer end of the wobble shaft 38. Upon operation of the hydraulic motor 16 under the influence of high pressure hydraulic fluid, the rotor 132 rotates relative to the stator 130 to rotate the wobble shaft 38. This rotation of the wobble shaft 38 rotates the splined input shaft 34 which is connected with the sun gear 48. The sun gear 48 is disposed within the axle spindle 24 between the two bearing assemblies 28 and 30. Upon rotation of the sun gear 48, idler gears 54, 56, and 58 which extend through openings in the wall of the axle spindle 24 into meshing engagement with the sun gear 48, are rotated to rotate the ring gear 72 which is fixedly connected with the hub 26.

Although the drive assembly 10 has been described herein in association with the wheel of a vehicle, it is contemplated that the drive assembly may be utilized in many different environments. For example, the drive assembly could be utilized to rotate the drum of a winch rather than a vehicle wheel. In such an environment, the hydraulic motor 16 would be connected with the base or frame of the winch with the spindle 24 in a coaxial relationship with the drum of the winch. The gear arrangement 32 would then transmit drive forces from the input shaft 34 to the hub 36 connected to the winch drum. Although the spindle 24 is disclosed as being in a coaxial relationship with the wheel 12 and may be advantageously mounted in a coaxial relationship with a winch drum, it is contemplated that the hub 26 may be provided with external gear teeth and merely form one gear in a train of gears connected with a drive member such as the winch drum or vehicle wheel.

Having described one specific embodiment of the invention the following is claimed:

1. An assembly for use in rotating an output member relative to a base, said assembly comprising an axially extending spindle fixedly connected with the base, a rotatable hub fixedly connected with the output member, a first bearing assembly disposed between and connected with axially inner portions of said spindle and said hub, a second bearing assembly disposed between and connected with axially outer portions of said spindle and said hub, said hub being rotatably supported on said spindle by said first and second bearing assemblies, a rotatable input member, motor means for rotating said input member, and gear means disposed between said first and second bearing assemblies and connected with said input member and said hub for rotating said hub at a rotational speed which is different than the rotational speed of said input member.

2. An assembly as set forth in claim 1 wherein said spindle includes surface means for defining a plurality of openings disposed between the inner and outer portions of said spindle, said gear means including a central gear connected with said input member and disposed within said spindle, a ring gear connected with said hub, and a plurality of idler gears each of which is disposed in meshing engagement with said ring gear and extends through an associated one of said openings in said spindle into meshing engagement with said central gear.

3. An assembly as set forth in claim 1 wherein said motor means includes a rotor connected with said input member and a housing which at least partially encloses said rotor and is integrally formed with said spindle.

4. An assembly as set forth in claim 1 wherein said motor means includes an internally toothed stator, an externally toothed rotor, and means for supporting said rotor for orbital and rotational movement relative to said stator, a drive link having a first end portion connected with said rotor for orbital and rotational movement therewith relative to said stator, coupling means connected with a second end portion of said drive link for transmitting only rotational motion from said drive link to said input member.

5. An assembly as set forth in claim 4 wherein said motor means further includes housing means for enclosing as said rotor and stator, said housing means including a positioning surface adapted to be disposed in abutting engagement with the base, said first and second end portions of said drive link being disposed on opposite sides of a plane containing said positioning surface.

6. An assembly as set forth in claim 1 wherein said input member is disposed within said spindle and is movable axially relative to said spindle between an engaged position in which said input member is effective to drive said gear means and a disengaged position in which said input member is ineffective to drive said input member, means for retaining said input member in said engaged position.

7. An assembly as set forth in claim 6 wherein said means for retaining said input member in said engaged position includes a snap ring movable from a first position to a second position within said spindle to effect movement of said input member from said engaged position to said disengaged position.

8. An assembly as set forth in claim 6 wherein said means for retaining said input member in said engaged position includes surface means for defining a chamber connected with a source of fluid under pressure.

9. An assembly as set forth in claim 1 wherein said gear means includes a first gear connected with said hub, a second gear mounted within said spindle and connected with said input member, and means for transmitting drive forces from said first gear to said second gear to effect rotation of said hub upon rotation of said input member.

10. An assembly for use in rotating an output member relative to a base, said assembly comprising a motor having a housing fixedly connected with the base, a spindle integrally formed with said motor housing and extending axially outwardly therefrom, said spindle including internal surface means at least partially defining a longitudinally extending chamber within said spindle, a hub rotatably supported on said spindle and adapted to be connected with said output member, a rotatable input member connected with said motor and at least partially disposed within said chamber in said spindle, said motor including means for rotating said input member, and gear means for transmitting drive forces from said input member to said hub, said gear means including a first gear connected with said input member and disposed within said chamber in said spindle, said input member and first gear being rotatable in said chamber about an axis which is coincident with a central axis of said spindle, a second gear fixedly connected with said hub, and a third gear disposed in meshing engagement with said first and second gears.

11. An assembly as set forth in claim 10 further including inner bearing means mounted on said spindle at a location axially outwardly of said motor housing for supporting said hub for rotation about said spindle and outer bearing means mounted on said spindle at a location axially outwardly of said first bearing assembly for further supporting said hub for rotation relative to said spindle.

12. An assembly for use in rotating an output member relative to a base, said assembly comprising a longitudinally extending spindle connected with the base, said spindle including a longitudinally extending wall having axially inner and outer end portions and first surface means for at least partially defining a longitudinally extending chamber within said spindle, said wall including second surface means disposed intermediate said axially inner and outer end portions and extending transversely to said first surface means for defining an opening to provide access to said chamber at a location intermediate said axially inner and outer end portions of said wall, a rotatable hub at least partially supported on said spindle and connected with the output member, a rotatable input member at least partially disposed within said chamber in said spindle, means for rotating said input member, and gear means for transmitting drive forces from said input member to said hub to effect rotation of said hub upon rotation of said input member, said gear means including a first gear disposed within said chamber in said spindle and connected with said input member, a second gear fixedly connected with said hub, and a third gear extending through said opening in said wall and disposed in meshing engagement with said first and second gears.

13. An assembly as set forth in claim 12 further including support means for supporting said third gear for rotation about an axis extending parallel to a longitudinal axis of said spindle, said support means and said third gear being disposed at a location intermediate parallel planes extending perpendicular to the longitudinal axis of said spindle and intersecting opposite ends of said spindle.

14. An assembly as set forth in claim 12 further including means for supporting said input member for axial movement in said chamber between a first position in which said input member is effective to rotate said first gear upon operation of said means for rotating said input member and a second position in which said input member is ineffective to rotate said first gear upon operation of said means for rotating said input member.

15. An assembly as set forth in claim 14 further including means for effecting movement of said input member between said first and second positions.

16. An assembly for use in rotating an output member relative to a base, said assembly comprising a spindle connected with the base, a hub connected with the output member, a first bearing assembly connected with inner portions of said spindle and said hub, a second bearing assembly connected with outer portions of said spindle and said hub, said spindle including first surface means for defining an axially extending chamber within said spindle and second surface means for defining a plurality of openings to said chamber at a plurality of spaced apart locations between said first and second bearing assemblies, an input member which is at least partially disposed within said chamber, motor means for rotating said input member, and gear means disposed between said first and second bearing assemblies and connected with said input member and said hub for rotating said hub at a rotational speed which is different than the rotational speed of said input member, said gear means including a first gear disposed within said chamber in said spindle and connected with said input member, a plurality of gears each of which extends through one of said openings in said spindle into meshing engagement with said first gear, and means for supporting said gears for rotation relative to said spindle.

17. An assembly for use in rotating an output member relative to a base, said assembly comprising an axially extending spindle fixedly connected with the base, said spindle including an axially extending wall having axially inner and outer end portions, first surface means for at least partially defining an axially extending chamber within said spindle, and second surface means for defining a plurality of openings to said chamber in said wall at locations between said axially inner and outer end portions of said wall, a hub fixedly connected with the output member, a first bearing assembly connected with said hub and said axially inner end portion of said spindle, a second bearing assembly connected with said hub and said axially outer end portion of said spindle, said first and second bearing assemblies being effective to rotatably support said hub on said spindle, a rotatable input member at least partially disposed within said chamber in said spindle, motor means disposed in a coaxial relationship with said spindle for rotating said input member about a central axis of said spindle, and gear means disposed between said first and second bearing assemblies and connected with said input member and said hub for rotating said hub at a rotational speed which is different than the roational speed of said input member upon rotation of said input member, said gear means including a sun gear disposed in said chamber in said spindle and rotatable about the central axis of spindle under the influence of forces transmitted to said sun gear by said input member upon operation of said motor means, a plurality of idler gears extending through said openings in said wall of said spindle into meshing engagement with said sun gear, means for supporting said idler gears for rotation about a plurality of spaced apart parallel axes disposed outside said chamber and extending parallel to the central axis of said spindle, and a ring gear connected with said output member and disposed in meshing engagement with said idler gears.

* * * * *

UNITED STATES PATENT OFFICE
CERTIFICATE OF CORRECTION

Patent No. 3,969,950      Dated July 20, 1976

Inventor(s) Jim Lee Rau et al

It is certified that error appears in the above-identified patent and that said Letters Patent are hereby corrected as shown below:

In claim 17, line 28, please insert after "of", --said--.

Signed and Sealed this

Thirtieth Day of November 1976

[SEAL]

Attest:

RUTH C. MASON
*Attesting Officer*

C. MARSHALL DANN
*Commissioner of Patents and Trademarks*

Disclaimer 3,969,950.—*Jim Lee Rau*, Lafayette, and *Hollis Newcomb White, Jr.*, West Lafayette, Ind. DRIVE ASSEMBLY. Patent dated July 20, 1976. Disclaimer filed Aug. 28, 1978, by the assignee, *TRW Inc.*

Hereby enters this disclaimer to claims 1, 2, 9, 12, 13, 16 and 17 of said patent.

[*Official Gazette October 17, 1978.*]